US009238702B1

(12) United States Patent
Fornof et al.

(10) Patent No.: US 9,238,702 B1
(45) Date of Patent: Jan. 19, 2016

(54) PHOTOBASE GENERATORS AS LATENT IONIC CROSSLINKERS FOR ACRYLIC PRESSURE-SENSITIVE ADHESIVES

(71) Applicant: 3M INNOVATIVE PROPERTIES COMPANY, St. Paul, MN (US)

(72) Inventors: Ann R. Fornof, St. Paul, MN (US); Babu N. Gaddam, Woodbury, MN (US); Hae-Seung Lee, Woodbury, MN (US); Jason D. Clapper, Lino Lakes, MN (US); Larry R. Krepski, White Bear Lake, MN (US); Mary M. Caruso, Maplewood, MN (US); Serkan Yurt, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 20 days.

(21) Appl. No.: 14/379,767

(22) PCT Filed: Feb. 8, 2013

(86) PCT No.: PCT/US2013/025268
§ 371 (c)(1),
(2) Date: Aug. 20, 2014

(87) PCT Pub. No.: WO2013/130238
PCT Pub. Date: Sep. 6, 2013

Related U.S. Application Data

(60) Provisional application No. 61/604,584, filed on Feb. 29, 2012.

(51) Int. Cl.
*C09J 7/02* (2006.01)
*C09J 133/14* (2006.01)
*C08F 220/68* (2006.01)
*C08F 222/10* (2006.01)

(52) U.S. Cl.
CPC ............. *C08F 222/10* (2013.01); *C09J 7/0217* (2013.01); *C09J 133/14* (2013.01)

(58) Field of Classification Search
USPC .................. 524/548, 555, 556; 522/152, 153; 526/312, 318.4; 428/355 AC
See application file for complete search history.

(56) References Cited

U.S. PATENT DOCUMENTS

| | | | |
|---|---|---|---|
| 4,619,979 A | 10/1986 | Kotnour | |
| 4,843,134 A | 6/1989 | Kotnour | |
| 5,130,347 A | 7/1992 | Mitra | |
| 5,637,646 A | 6/1997 | Ellis | |
| 5,650,261 A | 7/1997 | Winkle | |
| 5,804,610 A | 9/1998 | Hamer | |
| 2005/0032978 A1 | 2/2005 | O'Dwyer | |
| 2006/0052475 A1* | 3/2006 | Husemann | ............ C08F 220/12 522/79 |
| 2011/0237725 A1 | 9/2011 | Clapper | |

FOREIGN PATENT DOCUMENTS

| | | |
|---|---|---|
| JP | 2002-108016 | 4/2002 |
| WO | 01-72920 | 10/2001 |
| WO | 2009-123122 | 10/2009 |
| WO | 2010-113813 | 10/2010 |

OTHER PUBLICATIONS

Cameron, "Base Catalysis in Imaging Materials. 1. Design and Synthesis of Novel Light-Sensitive Urethanes as Photoprecursors of Amines", Journal of Organic Chemistry, 1990, vol. 55, pp. 5919-5922.
Cameron, "Photogeneration of Organic Bases From O-Nitrobenzyl-Derived Carbamates", Journal of the American Chemical Society, 1991, vol. 113, No. 11, pp. 4303-4313.
Frechet, "Photogenerated Amines and Diamines; Novel Curing Systems for Thin Film Coatings", Polymer Material Science and Engineering, vol. 64, 1991, pp. 55-56.
Shirai, "Photoacid and Photobase Generators: Chemistry and Applications to Polymeric Materials", Progress in Polymer Science, 1996, vol. 21, pp. 1-45.
Shirai, "Photochemical Reactions of Quaternary Ammonium Dithiocarbamates as Photobase Generators and Their Use in the Photoinitiated Thermal Crosslinking of Poly(glycidyl methacrylate)", Journal of Polymer Science: Part A: Polymer Chemistry, 2001, vol. 39, pp. 1329-1341.
International Search Report for PCT International Application No. PCT/US2013/025268, mailed on May 23, 2013, 3pgs.

* cited by examiner

*Primary Examiner* — Vu A Nguyen
(74) *Attorney, Agent, or Firm* — Kent S. Kokko

(57) ABSTRACT

The present disclosure provides an ionically crosslinkable composition comprising a (meth)acrylate copolymer component having pendant acid functional groups and pendant photobase functional groups. On exposure to light, the pendant photobase group photolyzes to provide a pendant amine group, that ionically crosslinks the copolymer.

13 Claims, No Drawings

PHOTOBASE GENERATORS AS LATENT IONIC CROSSLINKERS FOR ACRYLIC PRESSURE-SENSITIVE ADHESIVES

CROSS REFERENCE TO RELATED APPLICATIONS

This application is a national stage filing under 35 U.S.C. 371 of PCT/US2013/025268, filed Feb. 8, 2013, which claims priority to Provisional Application No. 61/604,584, filed Feb. 29, 2012, the disclosure of which is incorporated by reference in its/their entirety herein.

This invention relates to (meth)acrylate copolymer compositions that may be photoactivated by actinic radiation to ionically crosslink such copolymers. The pressure-sensitive adhesives and tape articles prepared therefrom are characterized by exhibiting an overall balance of adhesive and cohesive characteristics and exceptional load bearing capabilities.

BACKGROUND INFORMATION

Pressure-sensitive tapes are virtually ubiquitous in the home and workplace. In its simplest configuration, a pressure-sensitive tape comprises an adhesive and a backing, and the overall construction is tacky at the use temperature and adheres to a variety of substrates using only moderate pressure to form the bond. In this fashion, pressure-sensitive tapes constitute a complete, self-contained bonding system.

According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A. V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize a PSA.

With broadened use of pressure-sensitive tapes over the years, performance requirements have become more demanding. Shear holding capability, for example, which originally was intended for applications supporting modest loads at room temperature, has now increased substantially for many applications in terms of operating temperature and load. So-called high performance pressure-sensitive tapes are those capable of supporting loads at elevated temperatures for 10,000 minutes. Increased shear holding capability has generally been accomplished by crosslinking the PSA, although considerable care must be exercised so that high levels of tack and adhesion are retained in order to retain the aforementioned balance of properties.

There are two major crosslinking mechanisms for acrylic adhesives: free-radical copolymerization of multifunctional ethylenically unsaturated groups with the other monomers, and covalent or ionic crosslinking through the functional monomers, such as acrylic acid. Another method is the use of UV crosslinkers, such as copolymerizable benzophenones or post-added photocrosslinkers, such as multifunctional benzophenones and triazines. In the past, a variety of different materials have been used as crosslinking agents, e.g., polyfunctional acrylates, acetophenones, benzophenones, and triazines. The foregoing crosslinking agents, however, possess certain drawbacks which include one or more of the following: high volatility; incompatibility with certain polymer systems; generation of corrosive or toxic by-products; generation of undesirable color; requirement of a separate photoactive compound to initiate the crosslinking reaction; and high sensitivity to oxygen.

SUMMARY

The present disclosure provides an ionically crosslinkable composition comprising:
a (meth)acrylate copolymer component having pendant acid functional groups and pendant photobase functional groups. On exposure to light, the pendant photobase group fragments or photolyzes to provide a pendant amine group, that ionically crosslinks the copolymer. The adhesive composition may be used in the construction of adhesive articles, such as single and double coated adhesive tapes, and in affixing substrates together.

The pressure-sensitive adhesives of this disclosure provide the desired balance of tack, peel adhesion, and shear holding power, and further conform to the Dahlquist criteria; i.e. the modulus of the adhesive at the application temperature, typically room temperature, is less than $3 \times 10^6$ dynes/cm at a frequency of 1 Hz.

"Alkyl" means a linear or branched, cyclic or acylic, saturated monovalent hydrocarbon having from one to about 28, preferably one to 12, carbon atoms, e.g., methyl, ethyl, 1-propyl, 2-propyl, pentyl, and the like.

"Alkylene" means a linear saturated divalent hydrocarbon having from one to about twelve carbon atoms or a branched saturated divalent hydrocarbon radical having from three to about twelve carbon atoms, e.g., methylene, ethylene, propylene, 2-methylpropylene, pentylene, hexylene, and the like.

"heteroalkyl" includes both straight-chained, branched, and cyclic alkyl groups with one or more heteroatoms independently selected from S, O, and N with both unsubstituted and substituted alkyl groups. Unless otherwise indicated, the heteroalkyl groups typically contain from 1 to 20 carbon atoms. "Heteroalkyl" is a subset of "hydrocarbyl containing one or more S, N, O, P, or Si atoms" described below. Examples of "heteroalkyl" as used herein include, but are not limited to, methoxy, ethoxy, propoxy, 3,6-dioxaheptyl, 3-(trimethylsilyl)-propyl, 4-dimethylaminobutyl, and the like. Unless otherwise noted, heteroalkyl groups may be mono- or polyvalent, i.e. monovalent heteroalkyl or polyvalent heteroalkylene.

"aryl" is an aromatic group containing 6-18 ring atoms and can contain optional fused rings, which may be saturated, unsaturated, or aromatic. Examples of an aryl groups include phenyl, naphthyl, biphenyl, phenanthryl, and anthracyl. Heteroaryl is aryl containing 1-3 heteroatoms such as nitrogen, oxygen, or sulfur and can contain fused rings. Some examples of heteroaryl groups are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent, i.e. monovalent aryl or polyvalent arylene.

"(hetero)hydrocarbyl" is inclusive of hydrocarbyl alkyl and aryl groups, and heterohydrocarbyl heteroalkyl and heteroaryl groups, the later comprising one or more catenary oxygen heteroatoms such as ether or amino groups. Heterohydrocarbyl may optionally contain one or more catenary (in-chain) functional groups including ester, amide, urea, urethane, and carbonate functional groups. Unless otherwise indicated, the non-polymeric (hetero)hydrocarbyl groups typically contain from 1 to 60 carbon atoms. Some examples of such heterohydrocarbyls as used herein include, but are not limited to, methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", "aryl", and "heteroaryl" supra.

DETAILED DESCRIPTION

The present disclosure provides an ionically crosslinkable composition comprising:
a (meth)acrylate copolymer component having pendant acid functional groups and pendant amine photobase functional groups.

In one embodiment, the acid-functional copolymer may comprise a copolymer of interpolymerized monomer units including acid-functional monomer units, amine photobase functional monomer units, (meth)acrylate monomer units, optional non-acid functional, polar monomer units, optional vinyl monomer units and optional multifunctional (meth) acrylate monomer units. More particularly, the acid-functional (meth)acrylate copolymer may comprise:

1) 45 to 99 parts by weight, preferably 85 to 99 parts by weight, of an (meth)acrylic acid ester monomer units;
2) 0.5 to 15 parts by weight, preferably 5 to 10 parts by weight, of an acid functional monomer units;
3) 0.5 to 15 parts by weight of photobase generator monomer units;
4) 0 to 15 parts by weight of a second, non-acid functional, polar monomer units;
5) 0 to 15 parts vinyl monomer units, and
6) 0 to 5 parts by weight of multifunctional (meth)acrylate monomer units, where the sum of the monomer units is 100 parts by weight.

The (meth)acrylate ester monomer useful in preparing the acid functional (meth)acrylate adhesive copolymer is a monomeric (meth)acrylic ester of a non-tertiary alcohol, which alcohol contains from 1 to 14 carbon atoms and preferably an average of from 4 to 12 carbon atoms.

Examples of monomers suitable for use as the (meth)acrylate ester monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof, although combinations of two or more different (meth)acrylate ester monomers are suitable. In some embodiments, the preferred (meth) acrylate ester monomer is the ester of (meth)acrylic acid with an alcohol derived from a renewable sources, such as 2-octanol, citronellol, dihydrocitronellol.

The adhesive copolymer generally comprises 45 to 99, preferably 85 to 99 parts by weight of an (meth)acrylic acid ester monomer units, and most preferably 90 to 95 parts by weight.

In some embodiments it is desirable for the (meth)acrylic acid ester monomer component to include a high $T_g$ monomer. By high $T_g$ monomer it is meant the homopolymer of such monomers have a $T_g$ of at least 25° C., and preferably at least 50° C. Examples of suitable high $T_g$ monomers useful in the present invention include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, N-octyl acrylamide, and propyl methacrylate or combinations.

When high $T_g$ monomers are included, the (meth)acrylate ester component may include up to 30 parts by weight, preferably up to 20 parts by weight of the (meth)acrylate ester monomer component. The $T_g$ of the resulting copolymer may be estimated by the Fox equation, as is known in the art.

In some embodiments the (meth)acrylic acid ester monomer component may comprise (meth)acrylate ester of 2-alkyl alkanols wherein the molar carbon number average of said 2-alkyl alkanols is 12 to 32. The Guerbet alcohol Guerbet alkanol-derived (meth)acrylic monomers have the ability to form (co)polymers with unique and improved properties over comparable, commonly used PSA acrylate (co)polymers. These properties include a very low $T_g$, a low solubility parameter for acrylic polymers, and a low storage modulus creating a very conformable elastomer. This combination of properties provides PSAs with enhanced adhesion to low surface energy substrates as compared to current acrylic PSA compositions. When Guerbet monomers are included, the (meth)acrylate ester component may include up to 30 parts by weight, preferably up to 20 parts by weight of the (meth) acrylate ester monomer component. Such Guerbet (meth) acrylate esters are described in Applicant's copending U.S. 2011-0237725 (Lewandowski et al.) and is incorporated herein by reference.

The copolymer further comprises an acid functional monomer, where the acid functional group may be an acid per se, such as a carboxylic acid, or a portion may be a salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl(meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers of the acid functional copolymer are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomer is generally used in amounts of 0.5 to 15 parts by weight, preferably 5 to 10 parts by weight, based on 100 parts total monomer in the adhesive copolymer.

The polar monomers useful in preparing the copolymer are both somewhat oil soluble and water soluble. As used herein the term "polar monomers" are exclusive of acid functional monomers.

Representative examples of suitable polar monomers include but are not limited to 2-hydroxyethyl(meth)acrylate;

N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl)(meth)acrylates including 2-(2-ethoxyethoxy)ethyl(meth)acrylate, 2-ethoxyethyl(meth)acrylate, 2-methoxyethoxyethyl(meth)acrylate, 2-methoxyethyl methacrylate, polyethylene glycol mono(meth)acrylates; alkyl vinyl ethers, including vinyl methyl ether; and mixtures thereof. Preferred polar monomers include those selected from the group consisting of 2-hydroxyethyl(meth)acrylate and N-vinylpyrrolidinone. The polar monomer may be present in amounts of 0 to 15 parts by weight, preferably 0.1 to 10 parts by weight, most preferably 0.5 to 5 parts by weight, based on 100 parts by weight (meth)acrylate ester monomer.

When used, vinyl monomers useful in the (meth)acrylate polymer include vinyl esters (e.g., vinyl acetate and vinyl propionate), styrene, substituted styrene (e.g., α-methyl styrene), vinyl halide, and mixtures thereof. As used herein vinyl monomers are exclusive of acid functional monomers, acrylate ester monomers and polar monomers. Such vinyl monomers are generally used at 0 to 15 parts by weight, and when present, preferably 1 to 5 parts by weight, based on 100 parts by weight total monomer in the adhesive copolymer.

In order to increase cohesive strength of the coated adhesive composition, a multifunctional (meth)acrylate may be incorporated into the blend of polymerizable monomers. Examples of useful multifunctional (meth)acrylate include, but are not limited to, di(meth)acrylates, tri(meth)acrylates, and tetra(meth)acrylates, such as 1,6-hexanediol di(meth)acrylate, poly(ethylene glycol)di(meth)acrylates, polybutadiene di(meth)acrylate, polyurethane di(meth)acrylates, and propoxylated glycerin tri(meth)acrylate, and mixtures thereof. The amount and identity of multifunctional (meth)acrylate is tailored depending upon application of the adhesive composition. Typically, the multifunctional (meth)acrylate is present in amounts less than 5 parts based on total dry weight of adhesive copolymer. More specifically, the multifunctional (meth)acrylate may be present in amounts from 0.01 to 5 parts, preferably 0.05 to 1 parts, based on 100 parts total monomers of the copolymer.

The crosslinkable composition further comprises interpolymerized monomer units having pendant photobase generator groups that, on exposure to radiation, provides an amine. The use of the photobase generator (PBG) groups overcomes a problem in the art by controlling the rate of crosslinking. It has been found that acid-functional (meth)acrylate copolymer can be ionically crosslinked by amines. However, due to its high reactivity, the crosslinking reactions are very fast and uncontrollable; mixing acid-functional (meth)acrylate copolymer and amines results in instant gelation. The use of a photobase generator (PBG) can create free amines upon UV irradiation. When a copolymer containing amine photobase generator monomer units is formulated with acid-functional (meth)acrylate copolymer, the mixture is very stable and easy to process (e.g., coating) without any gelation. UV irradiation of this formulation can generate free pendant amines which can form ionic crosslinks by reacting with acid-functional monomer units of the (meth)acrylate copolymer.

The photobase generator groups are not specifically limited so long as the groups generate a pendant amine group directly or indirectly with light irradiation. Photobase generators useful in the present invention are any polymerizable monomers which liberate amines upon exposure to light, typically at a wavelength of about 270 to 420 nanometers, however other wavelengths may be suitable. The photobase generator includes groups that include an oxime ester, a benzyl carbamate, a benzoin carbamate, an O-carbamoylhydroxyamines, an O-carbamoyloximes, an aromatic sulfonamide, an N-arylformamide, or an 4-(ortho-nitrophenyl) dihydropyridine.

The acid-functional (meth)acrylate copolymer component further comprises monomer units having pendant amine photobase generator units. The (meth)acrylate copolymer having pendant amine photobase generators include interpolymerized units of monomers of the general formulae:

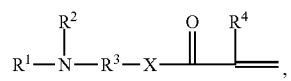

wherein
$R^1$ comprises a photolabile group that on exposure to light provides an amine group;
$R^2$ is H or a $C_1$-$C_4$ alkyl group;
$R^3$ is a (hetero)hydrocarbyl group, including divalent alkylene or arylene;
X is —O— or —NR—, and
$R^4$ is H or $C_1$-$C_4$ alkyl.

The adhesive copolymer comprises 0.5 to 15 parts by weight, preferably 5 to 10 parts by weight, of photobase generator monomer units.

It will be understood that the formula represents a photobase generator monomer unit wherein the polymerized monomer units having a pendant amine liberated by photolysis of the formula:

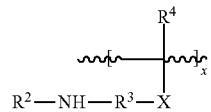

$R^1$ comprises a photolabile group that on exposure to light provides an amine group;
$R^2$ is H or a $C_1$-$C_4$ alkyl group;
$R^3$ is a (hetero)hydrocarbyl group, including divalent alkylene or arylene;
X is —O— or —NR$^2$—, and
$R^4$ is H or $C_1$-$C_4$ alkyl, and subscript x is the weight fraction of the monomer unit in the copolymer, i.e. 0.5 to 15 parts by weight based on 100 parts of total monomer in the copolymer.

Useful ortho-nitrobenzyl carbamates include compounds of the formula:

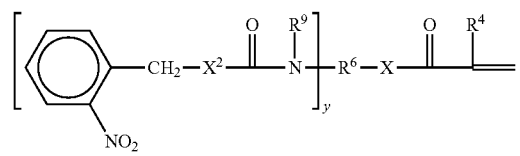

where
$R^9$ is hydrogen or alkyl,
$R^4$ is H or $C_1$-$C_4$ alkyl;
$X^2$ is —O— or —S—;
$R^6$ is polyvalent alkyl or aryl, and y is at least 1. It will be understood that the penyl group may be further substituted by one or more lower alkyl and/or alkoxy groups.

More specifically, suitable O-carbamoylhydroxylamines include compounds of the formula

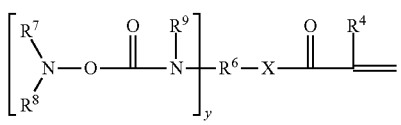

where
$R^7$ and $R^8$ are independently alkyl or aryl,
$R^9$ is hydrogen or alkyl,
$R^4$ is H or $C_1$-$C_4$ alkyl;
$R^6$ is polyvalent alkyl or aryl, and y is at least 1.

Suitable O-carbamoyloximes include compounds of the formula:

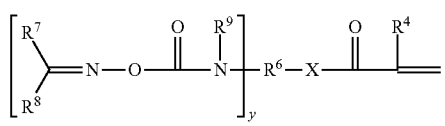

where
$R^7$ and $R^8$ are independently alkyl or aryl,
$R^9$ is hydrogen or alkyl,
$R^4$ is H or $C_1$-$C_4$ alkyl;
$R^6$ is polyvalent alkyl or aryl, and y is at least 1.

Suitable sulfonamides include compounds of the formula

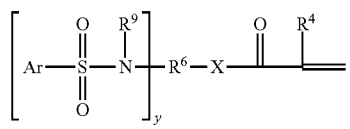

where Ar is an aryl group,
$R^9$ is hydrogen or alkyl,
$R^4$ is H or $C_1$-$C_4$ alkyl;
$R^6$ is polyvalent alkyl or aryl, and y is at least 1.

Other amides also will be suitable, for example formanilide and other aryl substituted amides. In the above described formulas, aryl is typically phenyl. As referred to in the above formulas, an alkyl group may be of a straight chain or branched configuration, or comprise a cyclic structure, and typically contains from 1 to 15 carbon atoms, more typically from 1 to 6 carbon atoms. An alkyl group is suitably either unsubstituted or substituted at one or more available positions. The substituents may be, for example, halo, aryl, or alkyl. Similarly, an aryl group also may be unsubstituted or substituted at one or more available positions by, for example, halo, aryl or alkyl.

The polymerizable photobase generators may be prepared by the reaction of a polymerizable ethylenically-unsaturated compound having a reactive isocyanate functional group with a photolabile compound having co-reactive amine or hydroxyl functional group. For example, the polymerizable photobase generators may be prepared by the reaction between a polymerizable ethylenically-unsaturated isocyanate functional compound with a photolabile compound having a reactive isocyanate reactive functionality. The isocyanate co-reactive functionality of the photolabile compound may comprise an alcohol or amine functional group.

Preferred isocyanate-functional monomers include isocyanatoalkyl esters of ethylenically unsaturated carboxylic acids such as 2-isocyanatoethyl methacrylate and 2-isocyanatoethyl acrylate; acryloyl isocyanates such as methacryloyl isocyanate, and other ethylenically-unsaturated isocyanate functional monomers such as those described in U.S. Pat. No. 5,130,347 (Mitra). Of these isocyanate functional monomers, 2-isocyanatoethyl methacrylate (IEM) is preferred due to its availability. It will be apparent to one skilled in the art that many pairs of electrophilic and nucleophilic functional groups may be used in the preparation of the polymerizable photobase monomers.

Suitable benzyl carbamates can be prepared by the reaction of a isocyanate-functional (meth)acrylate (such as isocyanatoalkyl(meth)acrylate) with a suitable benzyl alcohol in the presence of a suitable catalyst. Thus o-nitrobenzylcarbamate (meth)acrylate photobase monomers may be prepared by the reaction of 2-nitrobenzyl alcohol with as isocyanatoalkyl (meth)acrylate, neat or in a suitable solvent, typically with heating, and in the presence of a suitable catalyst. Suitable solvents include ether and tetrahydrofuran. Photoactivation of this base generator provides a copolymer having a pendant alkyl amine group.

Photobase generators are further described in M. Shirai et al. Photochemical Reactions of Quatemary Ammonium Dithiocarbamates as Photobase Generators and Their Use in The Photoinitiated Thermal Crosslinking of Poly(gycidyl-methacrylate), Journal of Polymer Science, Part A: Polymer Chemistry, vol. 39, pp. 1329-1341 (2001) and M. Shirai et al., "Photoacid and photobase generators: chemistry and applications to polymeric materials", Progress in Polymer Science, vol. 21, pp. 1-45, XP-002299394, 1996. For further information on the preparation of photobase generator compounds see J. Cameron et al., J. Am. Chem. Soc., vol. 113, no. 11, 4303-4313 (1991); J. Cameron et al., J. Polym. Mater. Sci. Eng., 64, 55 (1991); and J. Cameron, et al., J. Org. Chem., 55, 5919-5922 (1990), all of which are incorporated herein by reference for their teaching of preparation of photobase generator compounds. See also U.S. Pat. No. 5,650,261 (Winkel), incorporated herein by reference for its teaching of photobase generators and the preparation thereof.

The use of a photobase generator may produce residue products from the photochemical production of base. Upon exposure to actinic radiation, the photobase generators will photolyze yielding a pendant amine-functional copolymer and a residue compound. For example, monomer unit having a pendant benzyl carbamate of an amine will photolyze to yield the pendant amine group and a phenyl ketone as the "residue of a photobase generator". Oxime esters, O-carbamoylhydroxyamines, O-carbamoyloximes, and benzoin carbamates will yield ketones as residues. Benzyl carbamates will yield benzyl alcohols as residues. Ortho-nitrobenzyl carbamates will yield ortho-nitrosobenzaldehyde as a residue. Aromatic sulfonamides will yield the aromatic hydrocarbon moiety that was originally bonded to the sulfonyl group as a residue. Such residues are present in small amounts and do not normally interfere with the desired adhesive properties of the resulting copolymer. The residues may be detected by conventional analytical techniques, such as infrared, ultraviolet and NMR spectroscopy, gas or liquid chromatography, mass spectroscopy, or a combination of such techniques. Thus, the present invention may comprise cured (meth)acrylate adhesive copolymer and detectable amounts of residues from a photobase generator.

In each embodiment, the (meth)acrylate copolymer components may be prepared by exposing the component monomers to energy in the presence of an initiator, such as a thermal or photoinitiator. The polymerizations may be conducted in the presence of, or preferably in the absence of, suitable solvents such as ethyl acetate, toluene and tetrahydrofuran which are unreactive with the functional groups of the component (meth)acrylate co polymer(s).

The composition may be polymerized with either a thermal initiator or photoinitiator. Any conventional free radical initiator may be used to generate the initial radical. Examples of suitable thermal initiators include peroxides such as benzoyl peroxide, dibenzoyl peroxide, dilauryl peroxide, cyclohexane peroxide, methyl ethyl ketone peroxide, hydroperoxides, e.g., tert-butyl hydroperoxide and cumene hydroperoxide, dicyclohexyl peroxydicarbonate, 2,2,-azo-bis(isobutyronitrile), and t-butyl perbenzoate. Examples of commercially available thermal initiators include initiators available from DuPont Specialty Chemical (Wilmington, Del.) under the VAZO trade designation including VAZO™ 67 (2,2'-azo-bis(2-methybutyronitrile)) VAZO™ 64 (2,2'-azo-bis(isobutyronitrile)) and VAZO™ 52 (2,2'-azo-bis(2,2-dimethyvaleronitrile)), and Lucidol™ 70 from Elf Atochem North America, Philadelphia, Pa.

Useful photoinitiators include benzoin ethers such as benzoin methyl ether and benzoin isopropyl ether; substituted acetophenones such as 2,2-dimethoxyacetophenone, available as Irgacure™ 651 photoinitiator (Ciba Specialty Chemicals), or as Esacure™ KB-1 photoinitiator (Sartomer Co.; West Chester, Pa.), and dimethoxyhydroxyacetophenone; substituted α-ketols such as 2-methyl-2-hydroxy propiophenone; aromatic sulfonyl chlorides such as 2-naphthalenesulfonyl chloride; and photoactive oximes such as 1-phenyl-1,2-propanedione-2-(O-ethoxy-carbonyl)oxime. Particularly preferred among these are the substituted acetophenones.

It will be understood that useful photoiniators include those having an absorbance spectrum distinct and separate from those frequencies that would trigger the photobase generator group. Should the absorbance spectra of the photoinitiator and the photobase generator group overlap, initiation of monomer polymerization would concurrently initiate photolysis of the photobase generator group, leading to premature gellation. As a useful illustration, a nitrobenzyl photobase generator group absorbs and photolyzes in the range of 260-345 nm. One may select a photoinitiator having an absorbance maximum outside this range, such as Irgacure™ 819 having an absorbance range of 350-450. Different combinations of photobase generator groups and photoinitiators may be used.

These thermal and photoinitiators can be employed in concentrations ranging from about 0.0001 to about 3.0 pbw, preferably from about 0.001 to about 1.0 pbw, and more preferably from about 0.005 to about 0.5 pbw, per 100 pbw of the monomers.

Solventless polymerization methods, such as the continuous free radical polymerization method described in U.S. Pat. Nos. 4,619,979 and 4,843,134 (Kotnour et al.); the essentially adiabatic polymerization methods using a batch reactor described in U.S. Pat. No. 5,637,646 (Ellis); and, the methods described for polymerizing packaged pre-adhesive compositions described in U.S. Pat. No. 5,804,610 (Hamer et al.) may also be utilized to prepare the polymers.

The resulting copolymers have the general structure $\sim[M^{ester}]_a[M^{acid}]_b[M^{PBG}]_c[M^{polar}]_d[M^{multi}]_e\sim$, where $[M^{ester}]$ represents (meth)acrylate monomer units, $[M^{acid}]$ represent acid functional monomer units. $[M^{PBG}]$ represents photobase monomer units, $[M^{polar}]$, represent non-acid polar monomer units, $[M^{multi}]$ represent multifunctional (meth)acrylate monomer units, and the subscripts a to e represent the parts by weight of the respective monomer units in the adhesive copolymer, as previously described. The copolymer may be a block or random copolymer.

On exposure to light of a sufficient wavelength, the photobases generator group of the above copolymer photolyzes to provide a pendant amine. That is, all or a portion of the $M^{PBG}$ interpolymerized monomer units photolyze to $M^{AMINE}$ monomer units, providing a copolymer of the general formula $\sim[M^{ester}]_a[M^{acid}]_b[M^{AMINE}]_{c*}[M^{polar}]_d[M^{multi}]_e\sim$, where $[M^{AMINE}]$ are the interpolymerized monomer units having a pendant amine group, and the subscript "c*" represents the parts by weight of the monomer unit in the adhesive copolymer. It will be appreciated that subscript c* will be equal to or less than subscript c. The pendant amine group can ionically crosslink the copolymer by acid-base reaction with the pendant acid groups.

The curable composition may also be prepared by a syrup polymerization technique. "Syrup polymer composition" refers to a solution of a solute polymer in one or more solvent monomers, the composition having a viscosity of from 500 to 10,000 cPs at 22° C. Here, a monomer mixture consisting of the (meth)acrylate monomer, the acid functional monomer, optionally the polar monomer and vinyl monomer, but lacking the photobase generator monomer are combined and partially polymerized using a thermal- or photoinitiator. The resulting syrup polymer, comprising a (meth)acrylate solute copolymer and unreacted solvent monomers, is then combined with the photobase generator monomer and photoinitiator. Subsequent treatment with UV radiation will simultaneously polymerize the solvent monomers (including the photobase monomer) and photolyze the photobase generator group to yield a pendant amine. Alternatively, the photoinitiator and photobase generator groups may be chosen to have non-overlapping absorbances so that the photoinitiator may be initiated at a first frequency to polymerize the solvent monomers, and the photobase generator subsequently photolyzed at a second frequency.

The pressure sensitive adhesives may also contain one or more conventional additives. Preferred additives include tackifiers, plasticizers, dyes, antioxidants, and UV stabilizers. Such additives can be used if they do not affect the superior properties of the pressure sensitive adhesives.

If tackifiers are used, then up to about 100 parts by weight, preferably less than 75% by weight, and more preferably less than 50% by weight based on 100 parts by weight total adhesive polymer would be suitable. In some embodiments no tackifiers may be used. Suitable tackifiers for use with (meth) acrylate polymer dispersions include rosin acids, rosin esters, such as glycerol esters of rosin and pentaerythritol esters of rosin, terpene phenolic resins, hydrocarbon resins including hydrogenated hydrocarbon resins, and cumarone indene resins. The type and amount of tackifier can affect properties such as contactability, bonding range, bond strength, heat resistance and specific adhesion.

The adhesive composition of the present invention may contain a plasticizer, if desired. The plasticizer softens the adhesive, and as a result, the substrate is more easily wetted by the adhesive. Further, the use of a plasticizer may improve the adhesive properties, including peel and shear. The plasticizer may be hydrophobic oils, hydrophilic or a combination thereof. The plasticizer can be added in an amount ranging from about 0.1 to about 20 weight percent of the adhesive composition and preferably from about 0.5 to about 10 weight percent.

Useful plasticizers are compatible with the acrylic pressure sensitive adhesive, such that once the plasticizer is mixed into the acrylic pressure sensitive adhesive, the plasticizer does not phase separate from the pressure sensitive adhesive. By "phase separation" or "phase separate," it is meant that by differential scanning calorimetry (DSC) no detectable thermal transition, such as a melting or glass transition temperature can be found for the pure plasticizer in the plasticized adhesive composition. Some migration of the plasticizer from or throughout the plasticized adhesive can be tolerated, such as minor separation due to composition equilibrium or temperature influences, but the plasticizer does not migrate to the extent that phase separation occurs between the adhesive and the plasticizing agent. Plasticizer compatibility with the adhesive can also be dependent upon the chemical nature of the plasticizer and the monomeric content of the adhesive.

For non-aqueous compositions oil soluble species such as phthalates (e.g. dioctyl adipate, and bis 2-ethylhexyl adipate), citrates (e.g. trihexyl citrate and trioctyl citrate), adipates (e.g. dioctyl phthalate, and bis 2-ethylhexyl phthalate) and maleates (e.g. dibutyl maleate).

Adhesive articles may be prepared by coating the adhesive or pre-adhesive composition on a suitable support, such as a flexible backing Examples of materials that can be included in the flexible backing include polyolefins such as polyethylene, polypropylene (including isotactic polypropylene), polystyrene, polyester, polyvinyl alcohol, poly(ethylene terephthalate), poly(butylene terephthalate), poly(caprolactam), poly(vinylidene fluoride), polylactides, cellulose acetate, and ethyl cellulose and the like. Commercially available backing materials useful in the invention include kraft paper (available from Monadnock Paper, Inc.); cellophane (available from Flexel Corp.); spun-bond poly(ethylene) and poly(propylene), such as Tyvek™ and Typar™ (available from DuPont, Inc.); and porous films obtained from poly(ethylene) and poly(propylene), such as Teslin™ (available from PPG Industries, Inc.), and Cellguard™ (available from Hoechst-Celanese).

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metalized polymer films, or ceramic sheet materials may take the form of any article conventionally known to be utilized with pressure sensitive adhesive compositions such as labels, tapes, signs, covers, marking indicia, and the like.

The above-described compositions are coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary as previously described.

EXAMPLES

Test Methods

Peel Adhesion Test

A test sample was prepared by placing a 0.5 (12.2 cm) inch wide by 7 inch (178 cm) long adhesive tape on a 100 cm by 250 cm glass plate, which had been cleaned by wiping with isopropanol. The tape was rolled down onto the panel with two passes of a 2 kg roller. The test was conducted on a slip/peel tester (Instrumentors Inc.; Strongsville, Ohio) with the tape removed from the plate at a peel angle of 180° at a rate of 12 inches per minute (0.305 m/min) for a total of 10 seconds. The force required to remove the tape was measured in ounces per 0.5 inch. Measurements for two tape samples were averaged and values were converted to N/dm.

Shear Strength Test

Room Temperature Shear

A test sample was prepared by placing a 0.5 inch by 2 inch strip of adhesive coated tape on the edge of a stainless steel panel, that had been cleaned with isopropanol, so that the tape overlapped the panel by 0.5 inch by 1 inch, leaving a 1 inch by 0.5 inch portion of the tape free of the panel. The tape was rolled down onto the panel using two passes of a 2 kg roller. A 1000 gram weight was attached to the free end of the tape and the sample was hung vertically until failure occurred; that is the weight fell from the plate, or the test was terminated at 10,000 minutes. The time to failure was recorded. Tests were run in triplicate and the average time to failure or 10,000 minutes, if no failure, was reported.

High Temperature Shear

Test samples were prepared in the same manner as for the room temperature shear test except that a 500 gram weight was attached to the tape and samples were hung vertically in an oven set at 70° C. until failure or the test was terminated.

Preparation of 2-({[(2-nitrobenzyl)oxy]carbonyl}amino)ethyl 2-methylacrylate (NBMA)

A monomer was prepared by adding 14.4 g 2-nitrobenzyl alcohol (Alfa Aesar, Ward Hill, Mass.), 14.6 g isocyanatoethyl methacrylate (Aldrich, Milwaukee, Wis.), and 1 drop of dibutyltin dilaurate (Alfa Aesar, Ward Hill, Mass.) to a 4-ounce jar. The jar was sealed and placed in a 70° C. oven for 2 hours. The resulting reaction mixture was analyzed by infrared spectroscopy (Nexus 670 FT-IR E.S.P.; Thermo Nicolet Corporation; Madison, Wis.) which showed no absorbance at 2250 $cm^{-1}$, indicating substantially no remaining isocyanate functionality. The reaction mixture was cooled and 40 mL of toluene were added to it. The jar was then capped and refrigerated overnight. The next day, the white crystals that had separated were filtered off and dried to produce 26.9 g of NBMA. NMR and IR spectral analyses confirmed the structure of the product.

Example 1

A monomer mixture was prepared by adding 83.0 g of ethyl acetate to an 8 oz (236.5 mL) amber bottle followed by adding 38.65 g of isooctyl acrylate (IOA), 2.93 g of acrylic acid (AA—Alfa Aesar, Ward Hill, Mass.), 2.20 g of NBMA, and 43.6 mg of initiator (Vazo 67 (2,2'-Azobis(2-methylbutyronitrile); Dupont; Wilmington, Del.). The monomer mixture was purged with nitrogen for 10 minutes then placed in a launder-o-meter (Atlas, Inc.; Athens, Ga.) and run for 2 days at 60° C. to produce an adhesive polymer composition.

Example 2

An adhesive polymer composition was prepared as in Example 1 except the composition was prepared with 81.25 g of ethyl acetate, 40.27 g of IOA, 3.03 g AA, 0.45 g of NBMA, and 43.75 mg of initiator (Vazo 67).

Examples 3-8

Pressure sensitive adhesive tapes were prepared by knife coating the compositions of Examples 1 and 2, as shown in Table 1, onto a primed polyester film (Hostaphan™ 3SAB polyester film; Mitsubishi Polyester Film, Inc.; Greer, S.C.), and drying the coated film in an oven set at 100° C. The dried coating thickness of the adhesive was about 25 to 50 micrometers. The adhesives were then crosslinked by exposing the adhesive to UV radiation from a Fusion UV lamp (Fusion UV Systems INC.; Gaithersburg, Md.) having a Quartz UV H bulb at different energy levels shown in Table 1. The tapes were measured for 180° Peel Adhesion and Shear Strength. Results are shown in Table 1.

TABLE 1

| Ex | Adhesive Composition | UV Total Energy (mJ/cm$^2$) | Shear Strength (min) (RT) | Shear Strength (min) (70° C.) | 180° Peel (N/dm) |
|---|---|---|---|---|---|
| 3 | Example 1 | 200 | 117 | 10 | 60 |
| 4 | Example 1 | 400 | 2159 | 10000 | 53 |
| 5 | Example 1 | 600 | 10000 | 10000 | 48 |
| 6 | Example 1 | No UV cure | 28 | 1 | 78 |
| 7 | Example 2 | 600 | 10000 | 10000 | 34 |
| 8 | Example 2 | No UV cure | 34 | 3 | 40 | the compounder and allowed to mix for an additional 10 minutes. The mixing chamber was then cooled to 100° C. and the rotation of the mixing paddles was reversed to expel and collect blended adhesive material.

The adhesive mass was cooled and approximately 1.5 grams of the compounded material was placed between a primed polyester film (Hostaphan™ 3SAB polyester film; Mitsubishi Polyester Film, Inc.; Greer, S.C.) and a silicone treated polyester film (Silphan S36; Siliconature SPA; Godega di Sant'Urbano, Italy). This construction was placed between the plates of a heated press (Carver, Inc.; Wabash, Ind.) with plate temperatures set at 100° C. and compressed until the adhesive mass was approximately 0.08 millimeters thick to form a pressure sensitive adhesive coated film. The pressed film was cooled and the release liner was removed. Some of the adhesive samples were exposed a Fusion UV lamp (Fusion UV Systems INC.; Gaithersburg, Md.) having a Quartz UV H bulb. The adhesive coated films were cut into appropriate tape widths and lengths for testing and tested for Shear Strength and Peel Adhesion. Results are shown in Table 2.

TABLE 2

| Ex | Adhesive (g) | Foral 85E (g) | Escorez 2520 (g) | UV Total Energy (mJ/cm$^2$) | Static Shear @70° C. (min) | 180° Peel (N/dm) |
|---|---|---|---|---|---|---|
| 10 | 30 | 0 | 0 | 1200 | 10000 | 25 |
| 11 | 20 | 8.7 | 1.1 | 1200 | 10000 | 51 |
| 12 | 20 | 8.7 | 1.1 | 1500 | 10000 | 48 |
| 13 | 30 | 0 | 0 | No UV cure | 13 | 53 |

Example 9

A composition was prepared by mixing 110 g IOA, 8.1 g AA, 1.2 g NBMA, 0.24 g photoinitiator (Irgacure™819—Bis (2,4,6-trimethylbenzoyl)-phenylphosphineoxide; Ciba Specialty Chemicals; Tarrytown, N.Y.) and 0.18 g iso-octyl thioglycolate (Aldrich; Milwaukee, Wis.).

Rectangular pieces of 0.065 mm thick clear polyethylene vinyl acetate film (VA-24, Flint Hills Resources; Wichita, Kans.) were heat sealed on 3 edges to form pouches weighing about 1.4 g each. Each pouch was filled with about 28 grams of the composition and carefully heat sealed on the fourth edge, taking care to avoid trapping air bubbles. The pouches were then immersed in a constant temperature water bath at 17° C. and irradiated with lamps with emitting intensity visible blue light (Sylvania Super Blue F40T12-430 nm) for seven minutes on each side to polymerize the composition and form a pressure sensitive adhesive.

Examples 10-13

The adhesive of Example 7 in pouches was compounded with two tackifiying resins in the amounts shown in Table 2. The tackifying resins were Foral 85E (Eastman Co.; Kingsport, Tenn.) and Escorez 2520 (ExxonMobile Co.; Houston, Tex.). The pouches of adhesive were mixed in a high temperature compounder (Half Size Mixer; C. W. Brabender Instruments, Inc.; Hackensack, N.J.) for 5 minutes at a temperature setting of 145° C. and 100 revolutions per minute. Tackifying resins, if added, were added to the adhesive melt in This disclosure provides the following illustrative embodiments:

1. An ionically crosslinkable composition comprising a (meth)acrylate copolymer component having pendant acid-functional groups and pendant photobase generator groups.
2. The ionically crosslinkable composition of embodiment 1, wherein the pendant photobase generator is an oxime ester, a benzyl carbamate, a benzoin carbamate, an O-carbamoylhydroxyamine, an O-carbamoyloxime, an aromatic sulfonamide, an N-arylformamide, or an 4-(ortho-nitrophenyl)dihydropyridine.
3. The ionically crosslinkable composition of any of the previous embodiments, wherein the acid-functional (meth) acrylate copolymer component comprises:
    i. 45 to 99 parts by weight of an (meth)acrylic acid ester of non-tertiary alcohol;
    ii. 0.5 to 15 parts by weight of an acid functional ethylenically unsaturated monomer;
    iii. 0.5 to 15 parts by weight of ethylenically unsaturated monomer having photobase generator groups;
    iv. 0 to 10 parts by weight of a non-acid functional, ethylenically unsaturated polar monomer;
    v. 0 to 5 parts vinyl monomer; and
    vi. 0 to 5 parts of a multifunctional (meth)acrylate;
       based on 100 parts by weight total monomer.
4. The ionically crosslinkable composition of any of the previous embodiments, wherein on exposure to UV irradiation, the photobase generator groups photolytically cleave to yield pendent amine groups that ionically crosslink with the acid-functional groups.
5. The ionically crosslinkable composition of any of the previous embodiments wherein the (meth)acrylate copolymer component having pendant photobase generator groups comprises monomer units derived from monomers of the formula

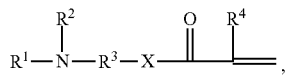

wherein
$R^1$ is a photolabile group which may be photolyzed to an amine;
$R^2$ is H or a $C_1$-$C_4$ alkyl group;
$R^3$ is a divalent alkylene or arylene;
X is —O— or —$NR^2$—,
$R^4$ is H or $C_1$-$C_4$ alkyl.

6. The ionically crosslinkable composition of embodiment 5 wherein $R^1$ is an oxime ester, a benzyl carbamate, a benzoin carbamate, an O-carbamoylhydroxyamine, an O-carbamoyloxime, an aromatic sulfonamide, an N-arylformamide, or an 4-(ortho-nitrophenyl)dihydropyridine.

7. The ionically crosslinkable composition of any of the previous embodiments, wherein the pendant said photobase generator group is an o-nitrobenzyl carbamate of an amine.

8. The ionically crosslinkable composition of any of the previous embodiments having zero weight percent of multifunctional (meth)acrylate monomer units.

9. The ionically crosslinkable composition of any of the previous embodiments comprising 5 to 10 parts by weight, of photobase monomer units.

10. The (meth)acrylate copolymer of any of the previous embodiments of the formula $\sim[M^{ester}]_a[M^{acid}]_b[M^{PBG}]_c[M^{polar}]_d[M^{multi}]_e\sim$, where

[$M^{ester}$] represents (meth)acrylate monomer units, [$M^{acid}$] represent acid functional monomer units. [$M^{PBG}$] represents photobase monomer units [$M^{polar}$], represent non-acid polar monomer units, [$M^{multi}$] represent multifunctional (meth)acrylate monomer units, and the subscripts a to e represent the parts by weight of the respective monomer units in the adhesive copolymer.

11. The copolymer of any of the previous embodiments prepared by free radical polymerization of acid-functional monomer units, amine photobase functional monomer units, (meth)acrylate monomer units, optional non-acid functional, polar monomer units, optional vinyl monomer units and optional multifunctional (meth)acrylate monomer units.

12. The copolymer of embodiment 11 wherein the free radical polymerization is initiated by a thermal or photoinitiator.

13. The copolymer of embodiment 12 wherein the free radical polymerization is initiated by a photoinitiator having an absorbance spectrum distinct from those frequencies that would trigger the photobase generator group.

14. The photolyzed (meth)acrylate copolymer of any of the previous embodiments of the formula:

$\sim[M^{ester}]_a[M^{acid}]_b[M^{AMINE}]_{c*}[M^{polar}]_d[M^{multi}]_e\sim$, where

[$M^{ester}$] represents (meth)acrylate monomer units, [$M^{acid}$] represent acid functional monomer units, [$M^{AMINE}$] are monomer units having a pendant amine group
[$M^{polar}$], represents non-acid polar monomer units, [$M^{multi}$] represent multifunctional (meth)acrylate monomer units, and the subscripts a, b, c*, d and e represent the parts by weight of the respective monomer units in the adhesive copolymer.

15. An ionically crosslinked (meth)acrylate copolymer comprising a copolymer of the formula:

$\sim[M^{ester}]_a[M^{acid}]_b[M^{AMINE}]_{c*}[M^{polar}]_d[M^{multi}]_e\sim$, where

[$M^{ester}$] represents (meth)acrylate monomer units, [$M^{acid}$] represent acid functional monomer units, [$M^{AMINE}$] are monomer units having a pendant amine group
[$M^{polar}$], represents non-acid polar monomer units, [$M^{multi}$] represent multifunctional (meth)acrylate monomer units, and the subscripts a, b, c*, d and e represent the parts by weight of the respective monomer units in the adhesive copolymer, and
the residue of a photobase generator group.

16. An adhesive article comprising the ionically crosslinked adhesive composition of any of the previous embodiments on a backing 17. The copolymer of any of the previous embodiments, wherein the photobase generator monomer units are orthonitrobenzyl carbamates of the formula:

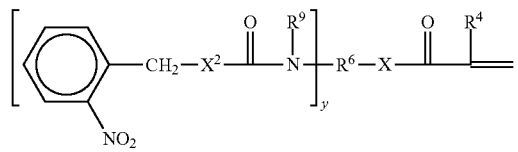

where
$R^9$ is hydrogen or alkyl,
$R^4$ is H or $C_1$-$C_4$ alkyl;
$X^2$ is —O— or —S—;
$R^6$ is polyvalent alkyl or aryl, and y is at least 1.

18. The copolymer of embodiment 4, wherein the monomer units having pendant amine groups liberated by photolysis of the formula:

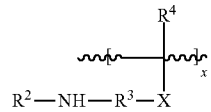

$R^1$ comprises a photolabile group that on exposure to light provides an amine group;
$R^2$ is H or a $C_1$-$C_4$ alkyl group;
$R^3$ is a (hetero)hydrocarbyl group, including divalent alkylene or arylene;
X is —O— or —$NR^2$—, and
$R^4$ is H or $C_1$-$C_4$ alkyl, and subscript x is the weight fraction of the monomer unit in the copolymer.

What is claimed is:
1. An ionically crosslinkable composition comprising a (meth)acrylate copolymer component having pendant acid-functional groups and pendant photobase generator groups, which on exposure to light, the pendant photobase groups fragment or photolyze to provide pendant amine groups to form ionic crosslinks with the acid-functional groups, wherein the (meth)acrylate copolymer component comprises:
  i. 45 to 99 parts by weight of an (meth)acrylic acid ester of non-tertiary alcohol;
  ii. 0.5 to 15 parts by weight of an acid functional ethylenically unsaturated monomer;
  iii. 0.5 to 15 parts by weight of ethylenically unsaturated monomer having photobase generator groups;

iv. 0 to 10 parts by weight of a non-acid functional, ethylenically unsaturated polar monomer;
v. 0 to 5 parts vinyl monomer; and
vi. 0 to 5 parts of a multifunctional (meth)acrylate;
based on 100 parts by weight total monomer, wherein the ethylenically unsaturated monomer having photobase generator groups has the following formula

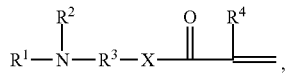

wherein
$R^1$ is a photolabile group which may be photolyzed to an amine;
$R^2$ is H or a $C_1$-$C_4$ alkyl group;
$R^3$ is a divalent alkylene or arylene;
X is —O— or —$NR^2$—;
$R^4$ is H or $C_1$-$C_4$ alkyl.

2. The ionically crosslinkable composition of claim 1 wherein $R^1$ is an oxime ester, a benzyl carbamate, a benzoin carbamate, an O-carbamoylhydroxyamine, an O-carbamoyloxime, an aromatic sulfonamide, an N-arylformamide, or an 4-(ortho-nitrophenyl)dihydropyridine.

3. The ionically crosslinkable composition of claim 1, wherein the pendant photobase generator group is an o-nitrobenzyl carbamate of an amine.

4. The ionically crosslinkable composition of claim 1 having zero weight percent of multifunctional (meth)acrylate monomer units.

5. The ionically crosslinkable composition of claim 1 comprising 5 to 10 parts by weight of photobase monomer units.

6. The ionically crosslinkable composition of claim 1 wherein the (meth)acrylate copolymer is of the formula

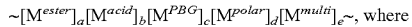

[$M^{ester}$] represents (meth)acrylate monomer units,
[$M^{acid}$] represent acid functional monomer units,
[$M^{PBG}$] represents photobase monomer units,
[$M^{polar}$], represent non-acid polar monomer units,
[$M^{multi}$] represent multifunctional (meth)acrylate monomer units,
subscript a is 45 to 99 parts by weight,
subscript b is 0.5 to 15 parts by weight,
subscript c is 0.5 to 15 parts by weight,
subscript d is 0 to 15 parts by weight,
subscript e is 0 to 5 parts by weight, and the sum of a to e is 100 parts by weight.

7. A method of manufacture of the composition according to claim 1 comprising a preparation of the copolymer by free radical polymerization.

8. The method of claim 7 wherein the free radical polymerization is initiated by a thermal or photoinitiator.

9. The method of claim 8 wherein the free radical polymerization is initiated by a photoinitiator having an absorbance spectrum distinct from those frequencies that would trigger the photobase generator group.

10. The ionically crosslinkable composition of claim 1 wherein the (meth)acrylate copolymer, when photolyzed, is of the formula:

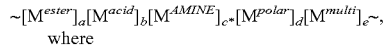

[$M^{ester}$] represents (meth)acrylate monomer units,
[$M^{acid}$] represent acid functional monomer units,
[$M^{AMINE}$] are monomer units having a pendant amine group,
[$M^{polar}$] represents non-acid polar monomer units,
[$M^{multi}$] represent multifunctional (meth)acrylate monomer units,
subscript a is 45 to 99 parts by weight,
subscript b is 0.5 to 15 parts by weight,
subscript c* is 0.5 to 15 parts by weight,
subscript d is 0 to 15 parts by weight,
subscript e is 0 to 5 parts by weight, and the sum of a to e is 100 parts by weight.

11. An adhesive article comprising the ionically crosslinkable adhesive composition of claim 1 on a backing.

12. The ionically crosslinkable composition of claim 1, wherein the photobase generator monomer units having photobase generator groups are derived from ortho-nitrobenzyl carbamates of the formula:

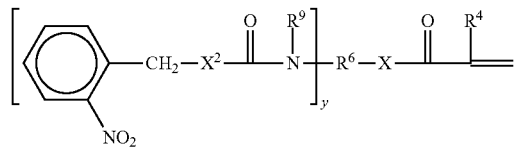

where
$R^9$ is hydrogen or alkyl,
$R^4$ is H or $C_1$-$C_4$ alkyl;
$X^2$ is —O— or —S—;
$R^6$ is polyvalent alkyl or aryl, and y is at least 1.

13. The ionically crosslinkable composition copolymer of claim 10, wherein the monomer units having pendant amine groups liberated by photolysis are of the formula:

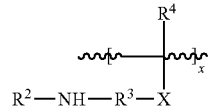

wherein x is 0.5 to 15 parts by weight based on 100 parts by weight of total monomer in the copolymer.

* * * * *

UNITED STATES PATENT AND TRADEMARK OFFICE
CERTIFICATE OF CORRECTION

| | | |
|---|---|---|
| PATENT NO. | : 9,238,702 B1 | Page 1 of 1 |
| APPLICATION NO. | : 14/379767 | |
| DATED | : January 19, 2016 | |
| INVENTOR(S) | : Ann Fornof | |

It is certified that error appears in the above-identified patent and that said Letters Patent is hereby corrected as shown below:

In the Specification

Column 6,
Line 22, delete "—NR—," and insert -- —$NR^2$—, -- , therefor.

Column 11,
Line 19, after "backing" insert -- . --.

Column 16,
Line 16, after "backing" insert -- . --.

In the Claims

Column 17,
Line 7, in Claim 1, after "formula" insert -- : --.

Column 18,
Line 43, in Claim 13, delete "copolymer of" and insert -- of --, therefor.

Signed and Sealed this
Twenty-fourth Day of May, 2016

Michelle K. Lee
*Director of the United States Patent and Trademark Office*